United States Patent [19]
Müller

[11] Patent Number: 4,867,879
[45] Date of Patent: Sep. 19, 1989

[54] PIPELINE SIEVE WITH A SUCTION REMOVAL DEVICE

[75] Inventor: Manfred Müller, Düsseldorf, Fed. Rep. of Germany

[73] Assignee: Taprogge Gesellschaft mbH, Wetter, Fed. Rep. of Germany

[21] Appl. No.: 256,208

[22] Filed: Oct. 7, 1988

Related U.S. Application Data

[63] Continuation of Ser. No. 738,661, May 28, 1985, abandoned.

[30] Foreign Application Priority Data

May 25, 1984 [DE] Fed. Rep. of Germany ....... 3419698

[51] Int. Cl.$^4$ .................... B01D 29/38; B01D 33/36; B01D 35/16
[52] U.S. Cl. ............................ 210/392; 210/393; 210/397; 210/408; 210/411; 210/414; 210/415; 210/497.01; 210/497.3
[58] Field of Search ............... 210/107, 130, 136, 137, 210/391, 392, 393, 396, 397, 398, 406, 408, 409, 411, 412, 413, 414, 415, 435, 446, 497.01, 497.3

[56] References Cited

U.S. PATENT DOCUMENTS

| | | | |
|---|---|---|---|
| 719,913 | 2/1903 | Wackerow | 210/136 |
| 748,821 | 1/1904 | Wackerow | 210/411 |
| 1,140,720 | 5/1915 | Simons | 210/435 |
| 1,977,601 | 10/1934 | Winton | 210/411 |
| 2,066,479 | 1/1937 | Mac Isaac | 210/415 |
| 2,275,958 | 3/1942 | Hagel | 210/908 |
| 2,834,474 | 5/1958 | Jalkanen | 210/408 |
| 3,112,263 | 11/1963 | Ellilia | 210/415 |
| 3,256,995 | 6/1966 | Schmid et al. | 210/489 |
| 3,334,747 | 8/1967 | Niccum et al. | 210/130 |
| 3,574,509 | 4/1971 | Fentis et al. | 210/108 |
| 3,622,006 | 11/1971 | Brunner | 210/391 |

FOREIGN PATENT DOCUMENTS 2327532 12/1974 Fed. Rep. of Germany .

Primary Examiner—Richard V. Fisher
Assistant Examiner—Wanda L. Millard
Attorney, Agent, or Firm—Herbert L. Lerner; Laurence A. Greenberg

[57] ABSTRACT

A device for mechanically purifying liquids in a pipeline includes a rotation-symmetrical sieve chamber forming a section of the pipeline and having an inlet with a central axis, a rotation-symmetrical sieve body having an inner surface and being disposed in the sieve chamber at an angle of substantially 30° to 60° relative to the central axis of the inlet, and a suction removal device for removing deposits from part of the inner surface of the sieve body, the suction removal device being coaxial with and upstream of the sieve body in flow direction of the liquid, and the sieve body and the suction removal device being rotatable relative to each other for successively sweeping all of the inner surface of the sieve body with the suction removal device.

19 Claims, 3 Drawing Sheets

PIPELINE SIEVE WITH A SUCTION REMOVAL DEVICE

This application is a continuation of application Ser. No. 738,661, filed May 28, 1985, now abandoned.

BACKGROUND OF THE INVENTION

1. Field of the Invention:

The invention relates to a device for mechanically purifying liquids, especially cooling water for a heat exchanger, with a sieve body which is disposed in a pipeline and a suction removal device upsteam of the sieve body for removing deposits from the sieve body.

2. Description of the Related Art

A device of this type is known, for instance, from German Pat. DE-PS 23 27 532. In that device, a cylindrical sieve is built into a cylindrical housing which is provided with lateral inlet and outlet stubs for the cooling water, so that the liquid passes through the sieve from the inside toward the outside. Within the cylindrical sieve area are cleaning nozzles which suck off contaminations deposited on the sieve due to the pressure difference in the sieve region. A device of this type has a very complex construction and cannot be placed directly in the pipeline, since it requires an additional voluminous housing with corresponding supply and discharge lines, as well as tube bends which result in an additional pressure loss.

SUMMARY OF THE INVENTION

It is accordingly an object of the invention to provide a device for mechanically purifying liquids, which overcomes the hereinaforementioned disadvantages of the heretofore-known devices of this general type, which can be directly built into the pipeline through which the cooling water is flowing, which permits the greatest construction flexibility corresponding to the requirements in each case and which requires no drives or linkages inside the liquid medium.

With the foregoing and other objects in view there is provided, in accordance with the invention, a device for mechanically purifying or cleaning liquids in a pipeline, especially cooling water for a heat exchanger, comprising a rotation-symmetrical sieve chamber forming a section of the pipeline and having an inlet stub with a central axis, a rotation-symmetrical sieve body having an inner surface and being disposed in the sieve chamber at an angle of substantially 30° to 60° relative to the central axis of the inlet, and a suction removal or discharge device for removing deposits from part of the inner surface of the sieve body, the suction removal device being coaxial with and upstream of the sieve body in flow direction of the liquid, and the sieve body and the suction removal device being rotatable relative to each other for successively sweeping all of the inner surface of the sieve body with the suction removal device.

With such a device it becomes possible to have the suction removal device emerge in a straight line from the sieve chamber, so that only one seal in the sieve chamber wall is necessary.

In accordance with another feature of the invention, the sieve chamber is spherical. In this case all connections and feedthroughs can be easily manufactured.

In accordance with a further feature of the invention, the sieve body is a flat disc, a cone or a spherical segment.

In accordance with an added feature of the invention, the sieve body is stationary and the suction removal device is rotatable.

In accordance with an additional feature of the invention, the suction removal device is stationary and the sieve body is rotatable.

In accordance with again another feature of the invention, the suction removal device includes a slot-shaped nozzle having a shape following the contour of the inner surface of the sieve body, the nozzle covering at least a strip of the sieve body from the edge to the center thereof, and the suction removal device includes a discharge line running through the central axis of the sieve chamber and being connected to the nozzle and extended through the sieve chamber wall.

In accordance with again a further feature of the invention, the slot-shaped nozzle includes an elastic rim. This avoids damage caused by solid or large deposits on the inner surface of the sieve.

In accordance with again an added feature of the invention, the sieve body has an outer surface, and including a water jet nozzle disposed at the outer surface of the sieve body opposite the slot-shaped nozzle. This is done in order to augment the rinsing action.

In accordance with again an additional feature of the invention, the water jet nozzle is rotatably driven, and including an injection water supply line connected to the water jet nozzle and coaxial with the sieve body at the outer surface thereof.

In accordance with yet another feature of the invention, there is provided a shaft connected from the water jet nozzle through the sieve element to the discharge line for driving the water jet nozzle.

In accordance with yet a further feature of the invention, the sieve chamber has a ring plate, the sieve body has an outer surface and a rim slideably supported on the ring plate, and including a shaft coaxial with the sieve body, extending through the sieve chamber and being connected to the outer surface of the sieve body for rotating the sieve body.

In accordance with yet an added feature of the invention, there is provided an over-pressure relief plate covering a circular opening formed in the sieve body. This is done in order to avoid interruptions in the passage of cooling water.

In accordance with yet an additional feature of the invention, the sieve body has an outer surface, and including a shaft disposed in the central axis of the relief plate being connected to the relief plate and passing through the sieve chamber wall at the outer surface of the sieve body for lifting the relief plate from the sieve body.

In accordance with still another feature of the invention, there is provided a scraper disposed on the slot-shaped nozzle for mechanically loosening particles from the sieve element.

In accordance with a concomitant feature of the invention, the sieve chamber has an outlet stub disposed diametrically opposite or at an angle relative to the inlet stub.

Other features which are considered as characteristic for the invention are set forth in the appended claims.

Although the invention is illustrated and described herein as embodied in a device for mechanically purifying liquids, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in:

DESCRIPTION OF THE PREFERRED EMBODIMENTS

Figure 1:
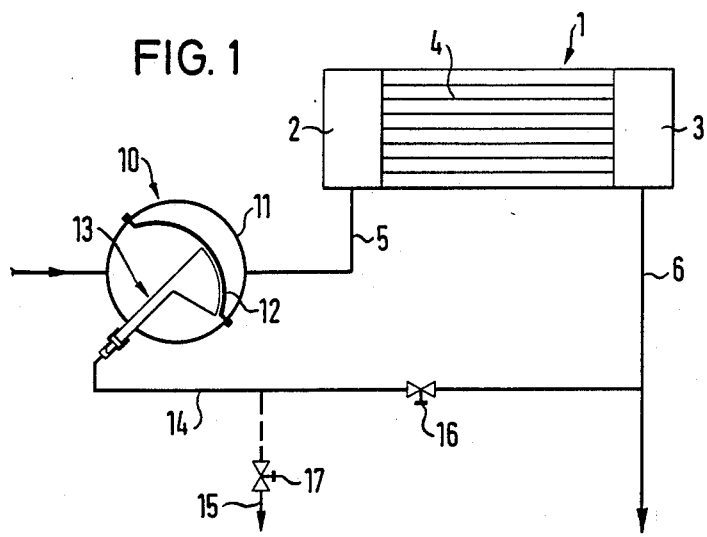
FIG. 1 is a schematic and diagrammatic view of a sieve or strainer device within the coolant circuit of a heat exchanger, illustrating the principle thereof.

Referring now in detail to the figures of the drawings and first, particularly, to FIG. 1 thereof, there is seen a heat exchanger 1, such as a power station condenser, with a cooling water inlet chamber 2, a cooling water discharge chamber 3, and condenser tubes 4 therebetween. The cooling water is admitted to the cooling water inlet chamber 2 through a pipeline 5 and after being heated, it is discharged from the coolant water outlet chamber 3 through a pipeline 6. A sieve or straining device 10 constructed according to the invention is disposed in the system. The device 10 is formed of a spherical sieve chamber 11, a spherical segmented sieve body 12, and a rotating suction device 13. Waste water with dirt deposits from the inside or inner surface of the sieve body 12 is sucked off and is discharged through a pipeline 14, either into the discharge pipeline 6, or through a special waste water line 15.

Figure 2:
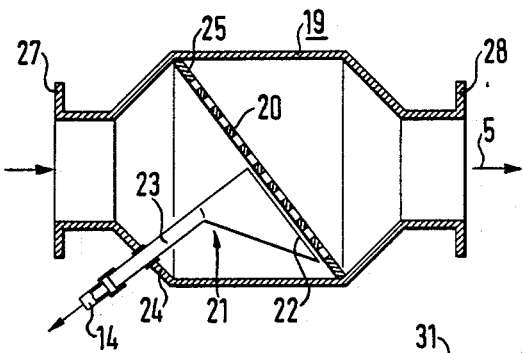
FIG. 2 is a longitudinal-sectional view of a cylindrical sieve chamber with a flat sieve or strainer.

In one embodiment according to FIG. 2, a symmetrical cylindrical sieve chamber 19 with an inlet tube 27 and an outlet stub 28 is inserted into the cooling water inlet pipeline 5. A sieve or screen element or body 20, in the form of a flat disk which forms an angle of about 40° with the axis of the tube, is provided in the sieve chamber. A suction discharge or removal device 21 is disposed in the same angular position, upstream of the sieve 20. The device 21 is formed of a slot nozzle 22 which extends closely adjacent the sieve from the middle to the edge thereof, as well as a suction discharge line 23 which is disposed at the side of the chamber. The suction line 23 is conducted from a conical part 24 of the sieve chamber 19 through a diagrammatically illustrated seal to the outside. The line 23 continues into the discharge pipeline 14 which is diagrammatically shown in FIG. 1.

After opening one of the valves 16 or 17 of FIG. 1, the suction device 21 can be rotated by a non-illustrated drive, either continuously, in predetermined intervals, or in dependence on the developing pressure drop in the contaminated sieve. In this way, the dirt deposited on the sieve by the developing pressure differences is removed from the surface of the sieve by the slot nozzle 22 and discharged by the suction line 23. All parts of the sieve 20 are cleaned by means of the rotation of the suction device 21. However, in the illustrated embodiment, it is necessary to shield the edge region 25 outside the circular sieve area 20, or to make it solid, because this region is not cleaned by the suction device 21.

Figure 3:
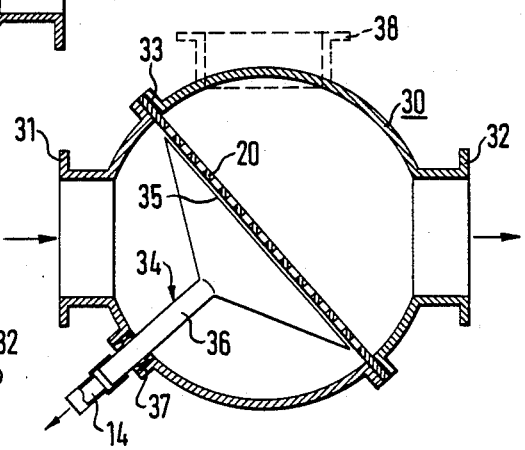
FIG. 3 is a cross-sectional view of a spherically-shaped sieve chamber with a flat sieve.

FIG. 3 shows a similar embodiment with a flat or planar sieve body or screen 20, although the sieve chamber 30 has a spherical shape. Considerable advantages are gained by a spherical configuration, because all connections and flanges can be attached to the sieve chamber 30 with circular section lines. Accordingly, this sieve chamber 30 has a parting flange 33, which forms an angle of between 30° and 60° to the main flow direction of the cooling water, and the flat sieve body element is clamped between the parts of the flange. A rotating suction device 34 which is disposed upstream of the sieve body 20, has a slot nozzle 35 that extends over the entire diameter of the sieve body 20, according to the illustrated embodiment, which is used as an example. A suction discharge line 36 is also brought to the outside and sealed through a stub 37 which lies at a right angle to the flange 33. The line 36 is connected to the pipelines 14 and 5 with stubs 31, 32 as described in FIG. 2, and is provided with a drive device. As shown in broken lines, it is also possible to place an outlet stub 38 at an angle with respect to the stub 31.

Figure 4:
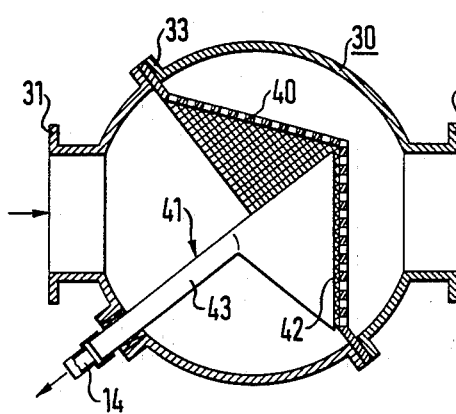
FIG. 4 is a longitudinal-sectional view of a spherical sieve chamber with a conical sieve.

In the embodiment shown in FIG. 4, a conical screen or sieve 40 is disposed in the sieve chamber 30 between the parts of the parting flange 33, in such a way that the point of the cone is oriented in the flow direction. Inside the chamber there is also a driven rotatable suction removal device 41, having a slot nozzle 42 that is oriented at the same angle to the suction discharge line 43, as half of the cone angle of the conical sieve 40. The conical configuration of the sieve element makes a greater sieve area available for the cooling water flowing through. The construction and drive device follows the same lines as explained for the embodiments of FIGS. 2 and 3.

Figure 5:
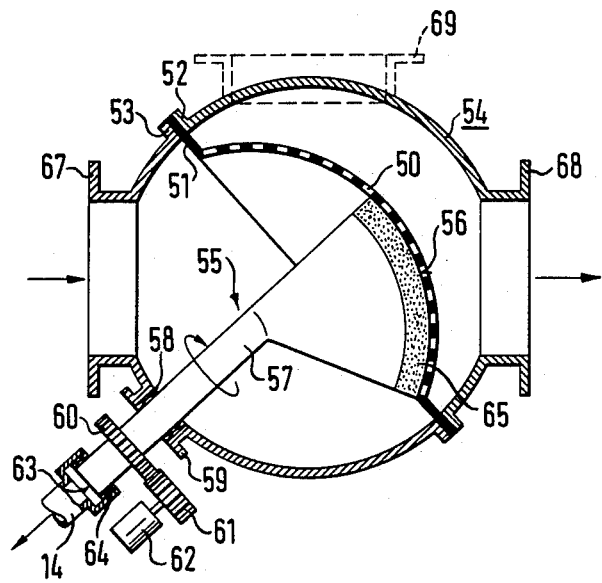
FIG. 5 is a longitudinal-sectional view of a spherical sieve chamber with a spherical segmental sieve, and a rotating, driven suction discharge device.

In the embodiment shown in FIG. 5, a spherical segmented sieve or screen body 50 with a flat rim flange 51 is inserted and sealingly clamped between the two parting flanges 52 and 53 of a spherical sieve chamber 54. The radius of curvature of the sieve element 50 can therefore be greater than or equal to the radius of curvature of the spherical sieve chamber 54. The suction discharge device 55 has a slot nozzle 56 with an inner end corresponding to the curvature of the sieve element and extending from the outer rim of the sieve element 50 to approximately its center, at the zenith of the spherical segment. The suction discharge line 57 is attached laterally and is brought to the outside through a rotary seal 58. Outside the sieve chamber 54, the discharge tube 57 is provided with a spur gear or gear ring 60, which are engaged by a drive pinion 61 of a motor 62, that rotates the suction device 55, so that it covers all regions of the inner surface of the sieve 50. The fixed waste water line 14 is attached to the other end 63 of the discharge line 57 by means of another rotary seal 64, in order to remove the waste water containing the filtered-out depositions.

In the illustrated embodiment, an elastic rim 65 is provided at the edge of the slot nozzle 56, which can be made of rubber, for instance, and slides directly on the inner surface of the sieve. This provision prevents jammed deposits or large and very hard deposits from damaging the actual rim of the slot nozzle 56, or obstructing the rotation of the suction device 55 itself.

Figure 6:
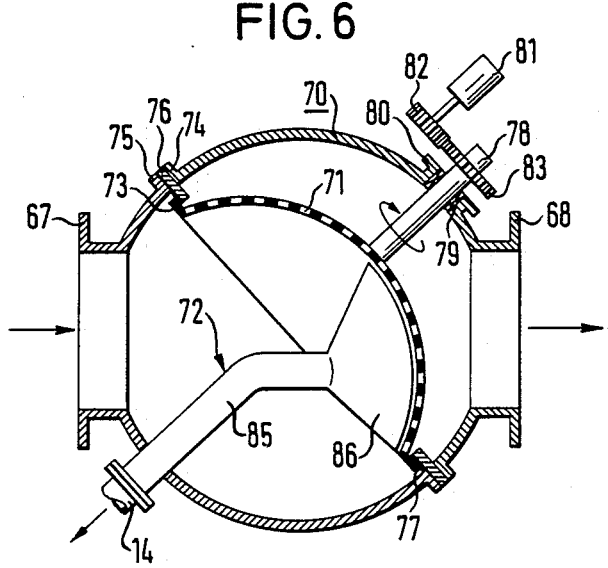
FIG. 6 is a longitudinal-sectional view of the device shown in FIG. 5, with a fixed suction discharge device and a rotating sieve.

A construction which is different in principle but has the same functional use, is shown in the embodiment according to FIG. 6. In this embodiment, a spherical segmented sieve body 71 is disposed in a spherical sieve chamber 70, but the sieve body is driven and rotates itself instead of being fixed, while the suction discharge or removal device 72 is rigidly mounted. The sieve body 71 is therefore slideably supported by a flat flange 73 on a ring plate 76 which is clamped between the chamber flanges 74 and 75. The sieve body 71 is provided on one side thereof with a low-friction material 77. A shaft 78 is fastened to the zenith or center of the sieve body 71. The shaft is brought to the outside through a rotary seal 79 in a stub 80 of the sieve chamber, and is rotated and driven by a motor 81 through a pinion 82 and a spur gear or gear ring 83 which seats on the shaft 78. In this case, the suction device 72 with its rigid suction discharge line 85 can be brought out through the wall of the chamber 70 without a costly seal, and is directly connected to the waste water line 14. In the illustrated embodiment, the slot nozzle 86 has the shape of a circular sector, so that the discharge line 85 is attached to the nozzle by a suitably angled tube section.

The last-described structure functions in the same way as the initially described version with the fixed sieve and the rotating suction device. With the rotating sieve device, it is also possible to construct the sieve body as a cone or as a flat plate.

Figure 7:
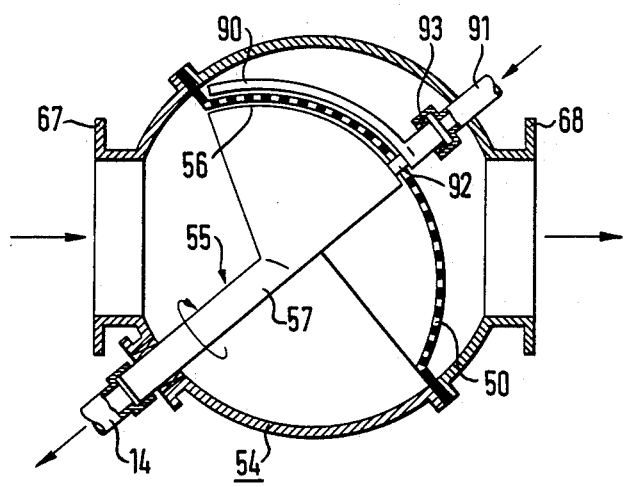
FIG. 7 is a longitudinal-sectional view of the device shown in FIG. 5 with an additional water injection nozzle.

The embodiment shown in FIG. 7 corresponds in principle to the construction according to FIG. 5. However, a nozzle 90 for additionally providing a water jet is disposed at the outside of the sieve body, to improve the cleaning action at the inside of the sieve body, because the existing pressure differences are sometimes not sufficient to clean the sieve optimally. This water jet nozzle 90 is also slot-shaped like the suction nozzle 56. The nozzle 90 is connected by a pipeline 91 to the outside, and is connected to a water source with sufficient pressure. In the embodiment shown in FIG. 7, the rotation of the water jet nozzle is accomplished by a shaft 92, which extends through the sieve body 50 in vicinity of the central axis of the sieve body, is fixedly connected with the discharge line 57 of the suction removal device 55 and is therefore synchronously rotated with the suction device 55. A rotary seal 93 is provided inside the sieve chamber 54 for connection to the water jet supply pipeline 91.

Figure 8:
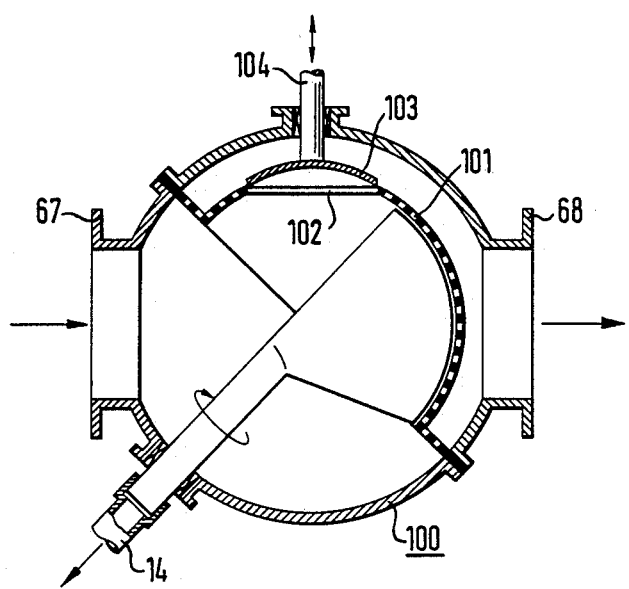
FIG. 8 is a longitudinal-sectional view of a spherical segmented sieve body with an additional over-pressure valve.

In the embodiment shown in FIG. 8, a hemispherical sieve body 101 with a somewhat smaller diameter than a spherical sieve chamber 100, is disposed concentrically to and within the sieve chamber. The sieve body 101 has a circular opening 102, which is covered at the outside by an over-pressure relief cover 103. The over-pressure relief cover 103 is connected to a shaft 104 which extends through the wall of the chamber 100 and through a seal and can be raised or lowered vertically to the sieve body by a non-illustrated actuator, which is located outside the sieve chamber. Such an over-pressure relief cover serves the purpose of avoiding a cut-off of the heat exchanger or condenser disposed downstream, caused by the drastically reduced cooling water passage during problems with the cleaning of the sieve element 101 or if there is too much debris. This is because in such an emergency, the over-pressure relief cover opens and permits the free passage of the cooling water, though in an unpurified condition.

As provided in the conventional way in FIG. 3 and FIG. 5, the outlet stubs 32, 68, respectively, can be disposed diametrically opposite the inlet stubs 31, 67, respectively. However, as indicated by the broken lines, it is also possible to place the outlet stub 38, 69, respectively, at an angle to the inlet stubs 31, 67, respectively. This angle may be 90°, or less, or more, so that a still greater flexibility and adaptability of the device to the local conditions and requirements is possible.

Thus, with the above-described structure and disposition of the sieve elements at an angle of 30° to 60° relative to the central axis of the cooling water inlet stub, it becomes possible to find an optimal arrangement with simple means, especially for the suction device, so that a smooth cooling water passage through the strainer or sieve device is possible and no drives or gearing devices located within the liquid are necessary.

I claim:

1. Device for mechanically purifying liquids in a pipeline, comprising a rotation-symmetrical spherical sieve chamber having a wall forming a section of the pipeline and having inlet means with a central axis and outlet means for liquid to be purified, a rotation-symmetrical sieve body having an inner surface, a central axis and a circular periphery and being disposed in said sieve chamber, said central axis of said sieve body being disposed at an angle of substantially 30° to 60° relative to said central axis of said inlet means, a suction removal device disposed in said sieve chamber at an angle of substantially 30° to 60° relative to said central axis of said inlet means for removing deposits from part of said inner surface of said sieve body, said suction removal device being coaxial with said sieve body, said sieve body and said suction removal device being rotatable relative to each other for successively sweeping all of said inner surface of said sieve body with said suction removal device, and a suction discharge line passing through said wall of said sieve chamber, running along said central axis of said sieve body and being connected to said suction removal device for rotating said suction removal device, for discharging debris and for holding said suction removal device in place.

2. Device according to claim 1, wherein said outlet means and said inlet means are perpendicular to tangents of said spherical sieve chamber.

3. Device according to claim 1, wherein said sieve body is a flat disk.

4. Device according to claim 1, wherein said sieve body is a cone.

5. Device according to claim 1, wherein said sieve body is a spherical segment.

6. Device according to claim 1, wherein said sieve body is stationary and said suction removal device is rotatable.

7. Device according to claim 1, wherein said suction removal device is stationary and said sieve body is rotatable.

8. Device according to claim 6, wherein said suction removal device includes a slot-shaped nozzle having a shape following the contour of said inner surface of said sieve body, said nozzle covering at least a strip of said sieve body from the edge to the center thereof, and said discharge line runs through the central axis of said sieve chamber and is connected to said nozzle.

9. Device according to claim 7, wherein said suction removal device includes a slot-shaped nozzle having a shape following the contour of said inner surface of said sieve body, said nozzle covering at least a strip of said sieve body from the edge of the center thereof, and said discharge line runs through the central axis of said sieve chamber and is connected to said nozzle.

10. Device according to claim 8, wherein said slot-shaped nozzle includes an elastic rim.

11. Device according to claim 8, wherein said sieve body has an outer surface, and including a water jet nozzle disposed at said outer surface of said sieve body opposite said slot-shaped nozzle.

12. Device according to claim 11, wherein said water jet nozzle is rotatably driven, and including an injection water supply line connected to said water jet nozzle and coaxial with said sieve body at said outer surface thereof.

13. Device according to claim 12, including a shaft connected from said water jet nozzle through said sieve body to said discharge line and through said wall of said sieve chamber, and means connected to said shaft outside said sieve chamber for driving said water jet nozzle.

14. Device according to claim 7, wherein said sieve chamber has a ring plate, said sieve body has an outer surface and a rim slideably supported on said ring plate, and including a shaft coaxial with said sieve body, extending through said sieve chamber and being connected to said outer surface of said sieve body, and means connected to said shaft outside said sieve chamber for rota-ting said sieve body.

15. Device according to claim 1, including an overpressure relief plate covering a circular opening formed in said sieve body.

16. Device according to claim 15, wherein said sieve body has an outer surface, and including a shaft disposed in the central axis of said relief plate being connected to said relief plate and passing through said sieve chamber at said outer surface of said sieve body for lifting said relief plate from said sieve body.

17. Device according to claim 8, including a scraper disposed on said slot-shaped nozzle for mechanically loosening particles from said sieve body.

18. Device according to claim 9, including a scraper disposed on said slot-shaped nozzle for mechanically loosening particles from said sieve body.

19. Device according to claim 1, wherein said outlet means is disposed diametrically opposite said inlet means.

* * * * *